May 29, 1923.

A. J. HICKS

CUSHION PNEUMATIC TIRE

Filed June 5, 1919

Inventor:
Albert J. Hicks.
By
Attorney.

May 29, 1923.

A. J. HICKS 1,456,775

CUSHION PNEUMATIC TIRE

Filed June 5, 1919

Inventor:
Albert J. Hicks,
By Fred'k J. Larson
Attorney.

Patented May 29, 1923.

1,456,775

UNITED STATES PATENT OFFICE.

ALBERT J. HICKS, OF ST. LOUIS, MISSOURI.

CUSHION PNEUMATIC TIRE.

Application filed June 5, 1919. Serial No. 301,979.

*To all whom it may concern:*

Be it known that I, ALBERT J. HICKS, a citizen of the United States, residing in the city of St. Louis and State of Missouri, have invented certain new and useful Improvements in Cushion Pneumatic Tires, of which the following is a specification.

My invention relates to an improved cushion pneumatic tire for motor vehicles, and has for its object to construct a tire having a plurality of spherical air chambers spaced apart by cushion walls and each air chamber provided with an air inlet and outlet tube which passes through the tire rim of the wheel to aid in retaining the tire upon the tire rim and prevent creeping of the tire upon the rim.

A further object of the invention is to provide the tire with one or more circumferential rows of spherical air chambers so that the tire can be used for pleasure vehicles while the tire provided with more than one row of spherical air chambers may be used as truck tires.

With the above and other objects in view, the invention may be briefly summarized as consisting in the novel features of construction and combination of elements hereinafter set forth, in detail, in the following description, drawings and claims hereto appended.

Referring to the accompanying drawings forming a part of this specification wherein like characters of reference denote similar parts throughout the several views.

In carrying out the invention, any preferred outer form of cushion body may be employed both for pleasure or truck tires.

Figure 2:
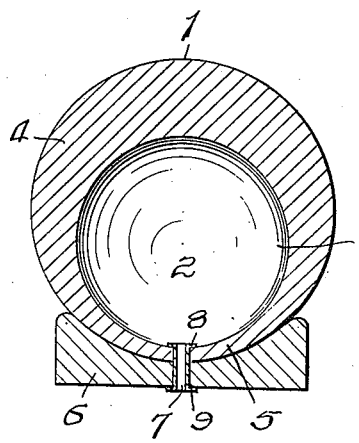
Fig. 2, is a transverse section on line 2—2 of Figure 1.

Referring to the drawings, the reference character 1 designates a cushion body formed from flexible material, such as rubber, or fabric and rubber vulcanized together and which is shown in Figure 2 as preferably circular in cross-section.

The casing 1 is provided with a multiplicity of spherical air-chambers 2 spaced apart by means of the partitions or walls 3 which spread out and terminate in the tread portion 4 of the tire on one side of the spherical air chambers 2 and terminate in the inner wall 5 of the cushion body on the opposite side of the spherical air-chambers 2. The interior spherical chambers 2 are of such relative location that they lie closer to the inner rim wall 5 of the tire than the outer tread wall 4 thereby providing a relatively thick tread wall for each chamber which progressively narrows to form the side walls thereof and finally becomes thinnest to form the inner or rim wall of the chambers, through which the tubes pass for both retaining the tire upon the wheel rim and permit the chambers to communicate with the atmosphere, as clearly shown in the drawings.

The casing or tire is mounted upon a suitable tire-rim 6 and is retained in position thereon by means of the tubular air inlet and outlet tubes 7. There is a tube 7 employed for each air chamber 2 which passes through the rim 6 and the inner wall 5 of the cushion body or tire 1. The outer end of each tube 7 is provided with a suitable head 8 while the inner end of each tube is provided with a suitable head 9.

The tubes 7 serve the double function of admitting air to the air chambers 2 and discharging air therefrom when the air chambers are compressed under a load, as well as preventing the tire from creeping upon the rim 6.

It will thus be seen that the tire or cushion body 1 is provided with a multiplicity of independent spherical air chambers 2 which are self inflatable to atmospheric pressure.

Figure 1:
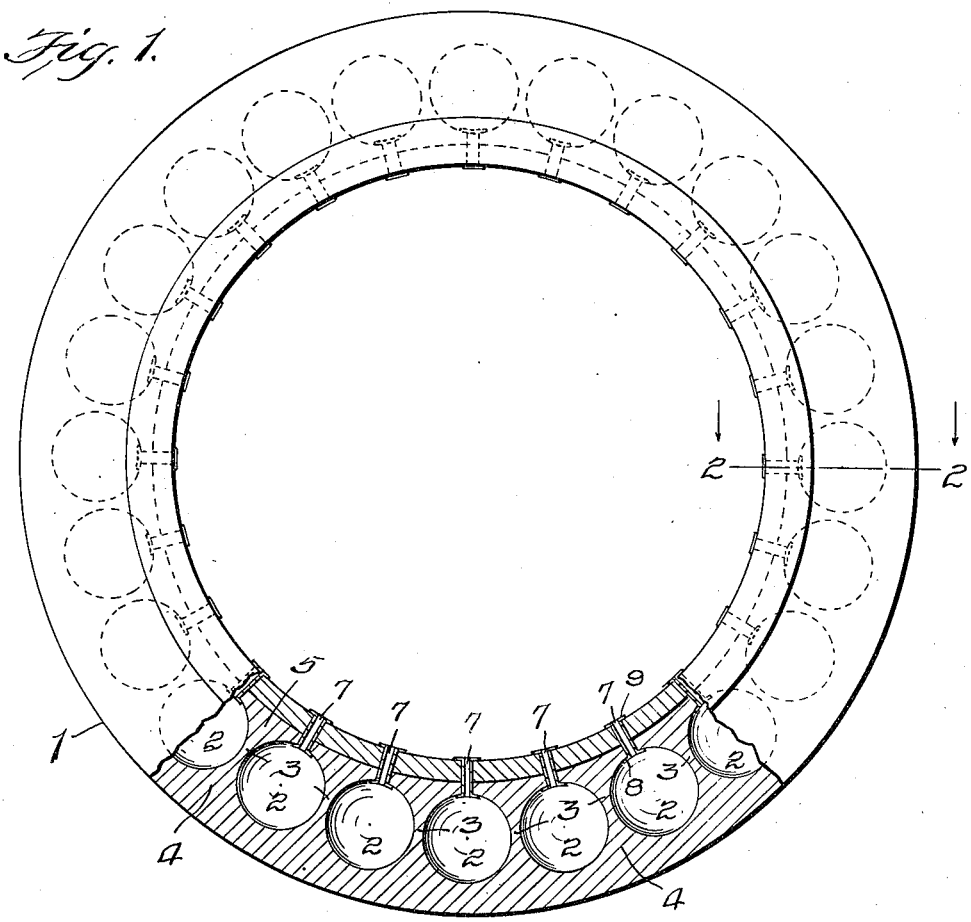
Fig. 1, is a side elevation, partly in longitudinal section of a cushion-pneumatic tire constructed and applied to a tire rim, in accordance with my invention.
Figure 3:
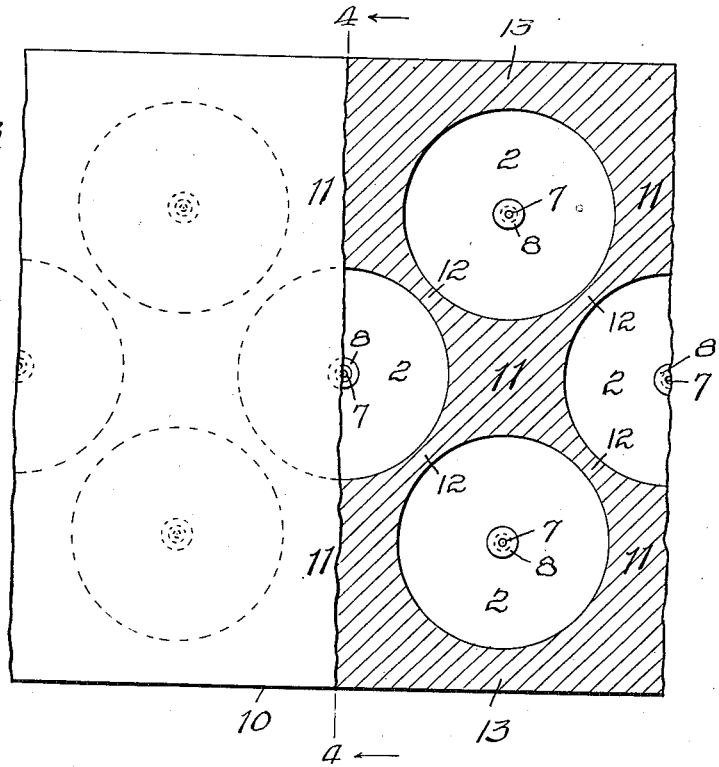
Fig. 3, is a plan view, partly in section, of a slightly modified form of tire to be used as a truck tire.
Figure 4:
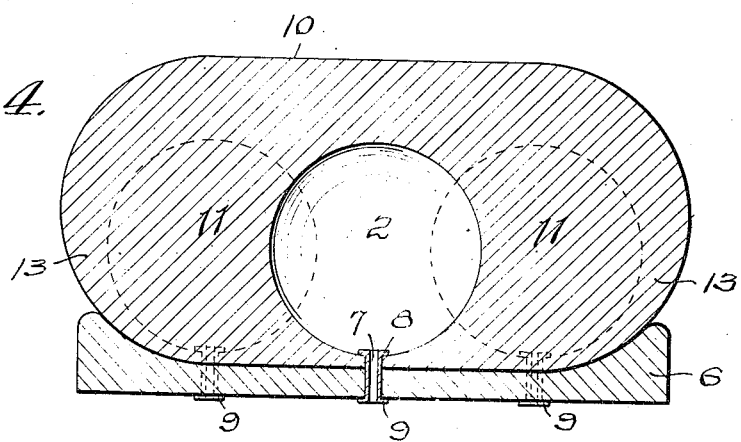
Fig. 4, is a transverse section on line 4—4 of Figure 3.

In the modified form of structure, I have shown in Figures 3 and 4, a tire 10 to be used as a truck tire and which is shown as provided with three rows of spherical air chambers 2, instead of but one row, as shown in Figures 1 and 2. It will be noted in Figures 3 and 4 that the three rows of air chambers provide a honeycomb effect and that the outer rows of air chambers 2 are arranged so as to set slightly between the center row of air chambers, thus providing a substantial body of rubber 11 between each set of four adjacent air chambers 2, while the separating walls 12 running on the diagonal are considerably thinner than the walls designated 11.

Each spherical air-chamber is entirely enclosed in the body 1 by flexible partitions which amply support and protect the side walls 13 of the entire body.

It will be observed that a tire constructed as herein described works or acts on the principle of a hollow rubber ball in rolling motion, as the time of intake of air through the tubes 7 from the time the load is off of a certain spherical air chamber is very much greater than the time of the outlet or discharge of air from the air chamber which takes place while the air chamber is under a load. It will be noted that the air in the airchambers which are under the load strain, is more or less compressed as all of the air in the air chambers under load cannot escape rapidly or freely through the tubes 7, but is forced out under the load strain, as is manifest.

The many advantages of a tire or casing constructed in accordance with my invention will readily suggest themselves to those skilled in the art to which it appertains.

While I have illustrated and described the preferred embodiment of my invention, I desire to have it clearly understood that the tires shown are merely illustrative and that slight changes in the form, proportion and minor details of construction may be resorted to without departing from the principle of the invention or sacrificing any of the advantages thereof, hence I reserve the right to make any such modifications as may fairly fall within the scope of the appended claims when fairly construed.

What I claim is:

1. In a tire structure of the class described, a cushion body provided with spherical air chambers, said body being circular in cross section and the spherical air chambers therein being equally spaced apart by relatively thin walls, said spherical air chambers being of such relative location that the tread wall of the body is of relatively large thickness progressively narrowing until the inner wall of the body becomes relatively thin, and said inner wall of the body being provided with a passage leading from each spherical air chamber.

2. In combination with a tire rim and a cushion body provided with spherical air chambers mounted thereon, air tubes passing through the rim and the inner walls of the air chambers of the cushion body, said tubes being provided at each end with a flanged head to prevent displacement of the tubes and said tubes serving the double function of admitting air into the air chambers of the cushion body and discharging air therefrom when the air chambers are compressed under a load.

In testimony whereof, I have hereunto signed my name to the specification.

ALBERT J. HICKS.